March 1, 1966  D. J. SIKORRA  3,238,445

SATURABLE CORE PULSE WIDTH CONTROL APPARATUS

Filed May 18, 1962

INVENTOR.
DANIEL J. SIKORRA

BY Roger W. Jensen

ATTORNEY.

United States Patent Office 3,238,445
Patented Mar. 1, 1966

3,238,445
SATURABLE CORE PULSE WIDTH CONTROL APPARATUS
Daniel J. Sikorra, Champlin, Minn., assignor to Honeywell Inc., a corporation of Delaware
Filed May 18, 1962, Ser. No. 195,916
7 Claims. (Cl. 323—75)

This invention pertains to control circuits and more particularly to a motor control circuit for driving two terminal loads such as a permanent magnet D.C. motor.

In a broad sense, the present invention comprises a bridge circuit having a transistor, or other current control means, in each leg thereof. A load device, such as a permanent magnet D.C. motor, is connected across one diagonal of the bridge while a source of energizing potential is connected across the other diagonal of the bridge.

A saturable transformer is connected in circuit with the bridge circuit so that the primary of the saturable transformer is energized by the conduction of the bridge transistors through the load device, and the secondary windings of the saturable transformer control the conduction and non-conduction of the bridge transistors.

A source of input signals is connected in circuit with the primary windings of the saturable transformer to vary the conduction and non-conduction time of the bridge transistors.

In normal circuit operation the transistors in first diagonally opposite legs of the bridge will conduct and hence a current will flow in a first direction through the load. The load voltage is then applied across the primary of the saturable transformer and after a predetermined time, determined by the volt-time characteristic of the transformer primary, the transformer will reach saturation. During the time that the transformer is saturating signals are induced in the transformer secondaries which hold the transistors in the first diagonally opposite legs of the bridge conducting and which hold the transistors in second diagonally opposite legs of the bridge non-conducting. When the transformer saturates, the field in the core collapses and signals are induced in the transformer secondaries such that the transistors in the first diagonally opposite legs of the bridge are cut off while the transistors in the second diagonally opposite legs of the bridge are turned on. When the transistors in the second diagonally opposite legs of the bridge conduct, a current will flow through the load device in a direction opposite to the current flow through the load when the transistor in the first diagonally opposite legs conduct. With no signal present from the input signal source the conduction time of the transistors in the first diagonally opposite leg of the bridge will be equal to the conduction time of transistors in the second diagonally opposite legs of the bridge.

The bridge transistors are substantially low impedance devices and hence when the transistors conduct, substantially the entire source of energizing potential is dropped across or applied to the load, the polarity of the load voltage reversing each time the transistors in the diagonally opposite legs of the bridge change conduction states.

When the conduction times of the transistors in the diagonally opposite legs of the bridge are equal, the time average load voltage will be zero. In the case where the load device is a permanent magnet motor, the load impedance to alternating current is high and hence the A.C. current through the load is small.

An input signal applied from the input signal source either aids or opposes the signal tending to saturate the saturable transformer and hence either decreases or increases respectively the conduction time of the transistors in diagonally opposite legs of the bridge. Since the conduction time of the bridge transistors is no longer equal, a resulting D.C. current will flow through the load and, in the case of a D.C. permanent magnet motor, the motor will produce a torque in one direction or the other depending upon the polarity of the input signal.

In a copending Sikorra application, Serial No. 113,885, filed May 31, 1961, now Patent No. 3,199,011, there is shown another motor control circuit. The invention of my copending application is applicable to various circuits. It is especially well adapted for control of those terminal loads such as a split field motor. The teaching is also applicable to two-terminal loads but the efficiency in such arrangements is relatively low. In the present invention, on the other hand, the efficiency of operation of two terminal loads is very high.

It is one object of this invention, therefore, to provide an improved control circuit.

Another object of this invention is to provide a control circuit particularly suited to the control of two terminal loads.

Figure 1:
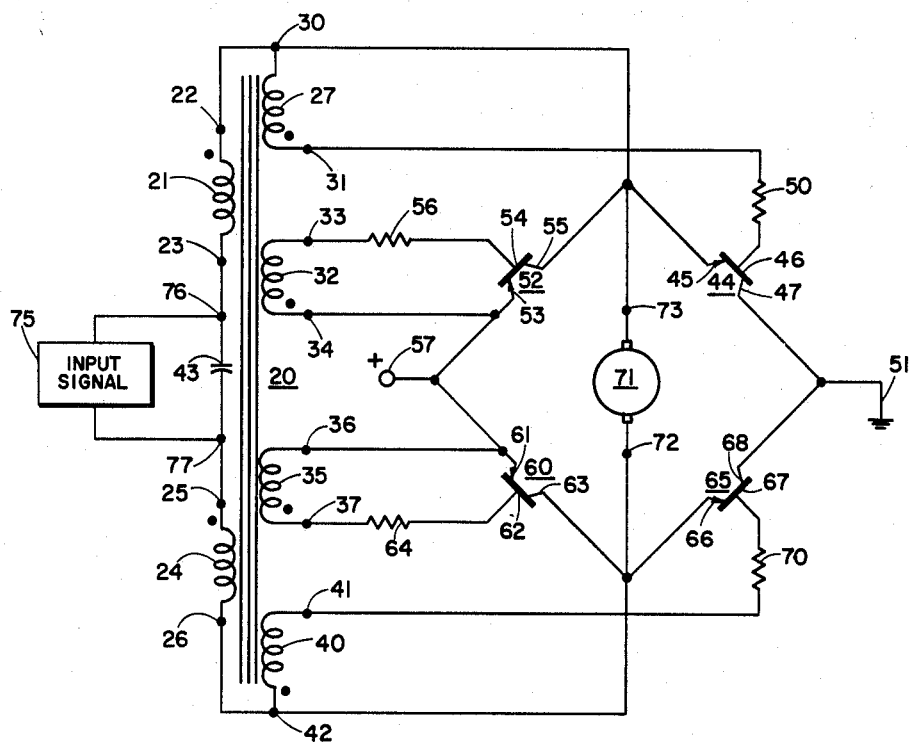
FIGURE 1 is a schematic diagram of an embodiment of this invention.

These and other objects of my invention will become apparent to those skilled in the art upon consideration of the accompanying specification, claims and drawing of which:

Structure of FIGURE 1

Referring to FIGURE 1, there is shown a saturable transformer 20 having a primary winding 21 having end terminals 22 and 23, a primary winding 24 having end terminals 25 and 26, a secondary winding 27 having end terminals 30 and 31, a secondary winding 32 having end terminals 33 and 34, a secondary winding 35 having end terminals 36 and 37, and a secondary winding 40 having end terminals 41 and 42.

End terminal 22 of primary winding 21 is directly connected to end terminal 30 of secondary winding 27. End terminal 23 of winding 21 is connected by means of a capacitor 43 to end terminal 25 of primary winding 24. End terminal 26 of primary winding 24 is directly connected to end terminal 42 of secondary winding 40.

End terminal 30 of secondary winding 27 is directly connected to an emitter 45 of a transistor 44. Transistor 44 further has a base 46 and a collector 47.

Base 46 of transistor 44 is connected by means of a resistor 50 to end terminal 31 of secondary winding 27. Collector 47 of transistor 44 is connected to ground 51. Emitter 45 of transistor 44 is directly connected to a collector 55 of a transistor 52. Transistor 52 further has an emitter 53 and a base 54.

Base 54 of transistor 52 is connected by means of a resistor 56 to end terminal 33 of secondary winding 32. End terminal 34 of secondary winding 32 is directly connected to emitter 53 of transistor 52. Emitter 53 of transistor 52 is directly connected to a source of energizing potential 57.

Potential source 57 is connected to an emitter 61 of a transistor 60. Transistor 60 further has a base 62 and an emitter 63.

Base 62 of transistor 60 is connected by means of resistor 64 to the end terminal 37 of secondary winding 35. End terminal 36 of secondary winding 35 is directly connected to emitter 61 of transistor 60. Collector 63 of transistor 60 is directly connected to an emitter 66 of a transistor 65. Transistor 65 further has a base 67 and a collector 68.

Base 67 of transistor 65 is connected by means of a resistor 70 to end terminal 41 of secondary winding 40. End terminal 42 of secondary winding 40 is connected to emitter 66 of transistor 65. Collector 68 of transistor 65 is connected directly to ground 51.

Emitter 66 of transistor 65 is connected to a terminal 72 of a load 71, in this case a D.C. permanent magnet motor. Load 71 further has a terminal 73. Terminal 73 of load 71 is directly connected to emitter 45 of transistor 44.

A source of input signals 75 has a first output terminal 76 and a second output terminal 77. Output terminal 76 of source 75 is directly connected to end terminal 23 of transformer primary winding 21, while output terminal 77 of input signal source 75 is directly connected to end terminal 25 of transformer primary winding 24.

*Operation of FIGURE 1*

In considering the operation of the circuit of FIGURE 1 assume that the output signal from input signal source 75 is zero and that transistors 52 and 65 are just beginning to conduct.

When transistors 52 and 65 conduct a current will flow from the potential source 57 through emitter 53 to collector 55 of transistor 52, load 71, and emitter 66 to collector 68 of transistor 65 to ground 51. Since transistors 52 and 65 are relatively low impedances when conducting, substantially the entire potential source 57 is dropped across load 71 such that terminal 73 is positive with respect to terminal 72.

The volt drop across load 71 is coupled across the primary windings 21 and 24 of saturable transformer 20 such that end terminal 22 of primary winding 21 is positive with respect to end terminal 26 of primary winding 24. The volt drop across primary windings 21 and 24 of saturable transformer 20 induces a voltage into the secondary windings 27, 32, 35 and 40 of transformer 20.

The voltage induced in secondary winding 27 is of a polarity such that end terminal 31 is positive with respect to end terminal 30. The positive voltage at end terminal 31 of secondary 27 is coupled through resistor 50 to the base 46 of transistor 44 thereby holding transistor 44 in an "off" or non-conducting state.

The voltage induced in secondary winding 35 is of a polarity such that end terminal 37 is positive with respect to end terminal 36. The voltage at end terminal 37 is coupled through resistor 64 to the base 62 of transistor 60 thereby holding transistor 60 in an "off" or non-conducting state.

The voltage induced in secondary winding 32 is such that end terminal 33 is negative with respect to end terminal 34. This negative potential at end terminal 33 of winding 32 is coupled through resistor 56 to the base 54 of transistor 52 thereby holding transistor 52 in its "on" or conducting state. Similarly, the voltage induced in secondary winding 40 is of a polarity such that end terminal 41 is negative with respect to end terminal 42. The negative voltage at end terminal 41 is coupled through resistor 70 to the base 67 of transistor 65 thereby holding transistor 65 in its "on" or conducting state.

The conduction of transistors 52 and 65 continues until the voltage produced across the primary windings 21 and 24 of saturable transformer 20 drive the transformer core to saturation. When the transformer saturates, the voltage induced in the transformer secondary windings 27, 32, 35 and 40 will disappear and a back E.M.F. will be generated by the collapsing fields around the secondary windings. The collapsing magnetic fields around the secondary windings induce opposite polarity signals in the secondary windings.

The signal induced in secondary winding 27 will be of a polarity such that terminal 31 is negative with respect to end terminal 30. The negative signal at end terminal 31 is coupled through resistor 50 to base 46 of transistor 44 thereby switching transistor 44 to its "on" or conducting state. Similarly, the signal induced in secondary winding 35 is of a polarity such that end terminal 37 is negative with respect to end terminal 36. The negative potential at end terminal 37 is coupled through resistor 64 to the base 62 of transistor 60 thereby switching transistor 60 to its "on" or conducting state.

At the same time, a signal is induced in secondary winding 32 such that end terminal 33 is positive with respect to end terminal 34. The positive potential at end terminal 33 is coupled through resistor 56 to base 54 of transistor 52 thereby switching transistor 52 to its "off" or non-conducting state. Similarly, the potential induced in secondary winding 40 is such that end terminal 41 is positive with respect to end terminal 42. The positive potential at end terminal 41 is coupled through resistor 70 to the base 67 of transistor 65 thereby switching transistor 65 to its "off" or non-conducting state.

Since transistors 44 and 60 are now conducting, a current will flow from the potential source 57 through emitter 61 to collector 63 of transistor 60, load 71, and emitter 45 to collector 47 of transistor 44 to ground 51. Since, as explained previously, transistors 44 and 60 are relatively low impedance devices when conducting, substantially all of potential source 57 is dropped across load device 71. The potential drop across load 71 is such that terminal 72 is positive with respect to terminal 73. The volt drop across load 71 is coupled across primary windings 21 and 24 of saturable transformer 20 such that end terminal 26 of primary winding 24 is positive with respect to end terminal 22 of primary winding 21.

As explained hereinbefore, the volt drop across primary windings 21 and 24 induce voltages in secondary windings 27, 32, 35 and 40. The voltages induced in secondary windings 32 and 40 will be of a polarity such as to hold transistors 52 and 65 respectively in their "off" or non-conducting state.

The voltages induced in secondary windings 27 and 35 are of a polarity such as to hold transistors 44 and 60 in their "on" or conducting states.

As in the case of the conduction of transistors 52 and 65, transistors 44 and 60 will continue to conduct until saturable transformer 20 is driven to saturation in the opposite direction, at which time the voltages induced in the transformer secondaries will disappear and a back E.M.F. will be generated which will again turn transistors 52 and 65 "on" and transistors 44 and 60 "off."

Figure 2:
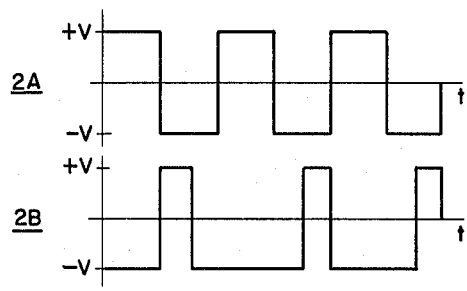
FIGURE 2A illustrates the output of the circuit of FIGURE 1 in the absence of a control signal.
FIGURE 2B illustrates the output of the circuit of FIGURE 1 when a control signal is applied.

FIGURE 2A shows an idealized wave form of the load voltage measured across load 71. Referring to FIGURE 2A it can be seen that the positive and negative half cycles of the rectangular wave load voltage have equal periods and equal but opposite magnitudes so that the time average of the load voltage will be zero.

Assume now that a D.C. input signal appears at the output of input signal source 75 such that terminal 76 is positive with respect to terminal 77.

When transistors 52 and 65 conduct, source 57 is effectively connected across primary windings 21 and 24 such that the positive terminal 57 is connected to terminal 22 of primary winding 21 and the negative terminal, or ground, 51 is connected to the end terminal 26 of primary winding 24. Thus, source 57 acts as an energizing source for primary windings 21 and 24.

It can readily be seen that the input signal is of a polarity such that it "opposes" potential source 57.

Since the volt-time product of saturable transformer 20 is a constant, when the energizing voltage increases the time required to saturate the core must decrease. Since, as explained above, the control signal "opposes" potential source 57, the time required to saturate the core when transistors 52 and 65 conduct, increases.

Assume that the input signal remains of the same polarity, that is, terminal 76 positive with respect to terminal 7. When transistors 44 and 60 conduct, source 57 will now be effectively connected across primary windings 21 and 24 such that end terminal 26 of primary winding 24 is positive with respect to end terminal 22 of primary winding 21. It can now be seen that the input signals "aids" energizing source 57 and hence the energizing voltage will increase. Since, as explained above, the volt-time product must remain a constant, and since the energizing voltage has increased, the time now required to saturate the core must decrease.

Figure 3:
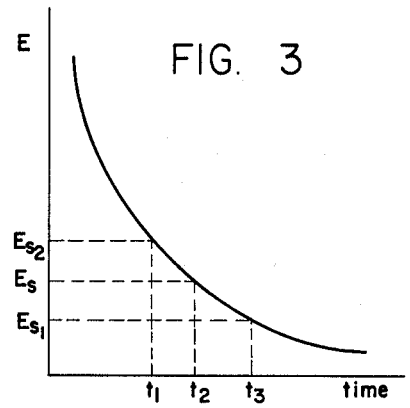
FIGURE 3 illustrates the effect of the control signal on the volt-time characteristic of the saturable transformer primary.

The effect of the input signal upon circuit operation can be seen by referring to FIGURE 3. FIGURE 3 shows a plot of the constant volt-time product for saturable transformer 20. When the input signal is zero, the voltage applied to primary windings 21 and 24 will be approximately equal to source voltage 57. This voltage is represented by $E_s$ in FIGURE 3.

When $E_s$ is applied to the transformer cores 21 and 24, the conduction time of the positive and negative conduction periods will be equal to $t_2$.

However, when a control signal is applied to the transformer primaries as explained above, this input signal will subtract from the source in one case, when transistors 52 and 65 conduct, and will add to the potential source when transistors 44 and 60 conduct. This can be seen in FIGURE 3 wherein voltage $E_{s2}$ represent voltage applied to the transformer primaries when transistors 44 and 60 conduct and $E_{s1}$ represents the voltage applied to the primaries when transistors 52 and 65 conduct. From FIGURE 3 it can be seen that when $E_{s2}$ is applied to the transformer primaries the time required to drive the core to saturation, that is $t_1$, has decreased, while when $E_{s1}$ is applied to the transformer primaries, the time required to drive the core into saturation, that is $t_3$, has increased.

The load waveform, when an input signal is applied to the circuit, is shown in FIGURE 2B. FIGURE 2B shows that the conduction time of the negative conduction period has increased while the conduction time of the positive conduction period has decreased, the magnitude of positive and negative conduction periods still being equal. If the input signal from signal source 75 is of the opposite polarity, that is, terminal 77 positive with respect to terminal 76, the input signal will "aid" potential source 57 when the transistors 52 and 65 conduct, and will "oppose" source 57 when transistors 44 and 60 conduct. In this case the load waveform across load device 71 is similar to that shown in FIGURE 2B except that the conduction time of the positive conduction period is longer than the conduction time of the negative conduction period.

It is to be understood that while I have shown a specific embodiment of my invention, that this is for the purpose of illustration only and that my invention is to be limited solely by the scope of the appended claims.

What I claim is:

1. Apparatus of the class described comprising:
first, second, third and fourth current control means;
means connecting said first and third current control means in series;
means connecting said second and fourth current control means in series across said first and third current control means so as to form a bridge circuit;
means for connecting a load across one diagonal of said bridge circuit;
means for connecting a source of energizing potential across the other diagonal of said bridge circuit;
a saturable transformer having primary windings and first, second, third and fourth secondary windings;
means connecting the primary windings of said saturable transformer across said load means;
means connecting the first, second, third and fourth secondary windings of said saturable transformer in controlling relation to said first, second, third and fourth current control means respectively;
and means for connecting a source of input signals in circuit with the primary windings of said saturable transformer.

2. Apparatus of the class described comprising:
first, second, third, and fourth transistors each having a collector electrode, a base electrode, and an emitter electrode;
means connecting said first and third transistors in series;
means connecting said second and fourth transistors in series across said first and third transistors so as to form a bridge circuit;
load means connected across one diagonal of said bridge circuit;
a source of energizing potential connected across the other diagonal of said bridge circuit;
a saturable transformer having primary windings and first, second, third, and fourth secondary windings;
means connecting the primary windings of said saturable transformer across said load means;
means connecting the first, second, third, and fourth secondary windings of said saturable transformer from the base to emitter electrodes of said first, second, third, and fourth transistors respectively;
and a source of input signals connected in circuit with the primary windings of said saturable transformer.

3. Apparatus of the class described comprising:
a transistorized bridge circuit, said bridge circuit having a transistor in each leg thereof;
load means connected across one diagonal of said bridge circuit;
a source of energizing potential connected across the other diagonal of said bridge circuit;
a saturable transformer having primary and secondary windings wound in inductive relation thereto;
means connecting the primary windings of said saturable transformer across said load means;
means connecting the secondary windings of said saturable transformer in controlling relation to said bridge circuit, whereby signals induced in said secondary windings produce conduction in transistors in first diagonally opposite legs of the bridge circuit and non-conduction in transistors in second diagonally opposite legs of the bridge circuit;
and a source of input signals connected in circuit with the primary windings of said saturable transformer to vary the conduction and non-conduction times of of the transistors in the first and second diagonally opposite legs of the bridge circuit.

4. Apparatus of the class described comprising:
a transistorized bridge circuit, said bridge circuit having a transistor in each leg thereof;
a source of energizing potential connected across one diagonal of said bridge circuit;
load means connected across the other diagonal of said bridge circuit;
a saturable transformer having primary and secondary windings wound in inductive relation thereto;
means connecting the primary windings of said saturable transformer across said load means;
means connecting the secondary windings of said saturable transformer to said transistorized bridge circuit whereby transistors in a first diagonally opposite legs of said bridge will conduct during a first time period and transistors in second diagonally opposite legs of said bridge will conduct during a second time period;
and a source of input signals connected in circuit with the primary windings of said saturable transformer to vary the duration of said first and second time periods.

5. Apparatus of the class described comprising:
a transistorized bridge circuit, said bridge circuit having a transistor in each leg thereof;
means for connecting a source of energizing potential across one diagonal of said bridge circuit;

means for connecting load means across the other diagonal of said bridge circuit;

a saturable transformer having primary and secondary windings wound in inductive relation thereto;

means connecting the primary windings of said saturable transformer across said load means;

means connecting the secondary windings of said saturable transformer to said transistorized bridge circuit whereby transistors in first diagonally opposite legs of said bridge will conduct during a first time period and transistors in second diagonally opposite legs of said bridge will conduct during a second time period;

and means for connecting a source of input signals in circuit with the primary windings of said saturable transformer to vary the duration of said first and second time periods.

6. Apparatus of the class described comprising:

first, second, third, and fourth current control means each having a collector electrode, a base electrode, and an emitter electrode;

means connecting said first and third current control means in series;

means connecting said second and fourth current control means in series across said first and third current control means so as to form a bridge circuit;

load means connected across one diagonal of said bridge circuit;

a source of energizing potential connected across the other diagonal of said bridge circuit;

a saturable transformer having primary windings and first, second, third, and fourth secondary windings;

means connecting the primary windings of said saturable transformer across said load means;

means connecting the first, second, third, and fourth secondary windings of said saturable transformer in controlling relation to said first, second, third, and fourth current control means respectively;

and means for connecting a source of input signals in circuit with the primary windings of said saturable transformer.

across the other diagonal of said bridge circuit;

means connecting the primary windings of said satur-

7. Apparatus of the class described comprising:

a transistorized bridge circuit, said bridge circuit having a transistor in each leg thereof;

means for connecting a load means across one diagonal of said bridge circuit;

means for connecting a source of energizing potential across the other diagonal of said bridge circuit;

a saturable transformer having primary and secondary windings wound in inductive relation thereto;

means connecting the primary windings of said saturable transformer across said load means;

means connecting the secondary windings of said saturable transformer in controlling relation to said bridge circuit, whereby signals induced in said secondary windings produce conduction in transistors in first diagonally opposite legs of the bridge circuit and non-conduction in transistors in second diagonally opposite legs of the bridge circuit;

and means for connecting source of input signals in circuit with the primary windings of said saturable transformer to vary the conduction and non-conduction times of the transistors in the first and second diagonally opposite legs of the bridge circuit.

References Cited by the Examiner
UNITED STATES PATENTS

| | | | |
|---|---|---|---|
| 2,821,639 | 1/1958 | Bright et al. | 323—75 X |
| 2,897,296 | 7/1959 | Buchhold | 323—75 X |
| 2,931,991 | 4/1960 | Schultz | 321—2 X |
| 3,034,072 | 5/1962 | Hakimoglu | 331—113.1 |
| 3,067,378 | 12/1962 | Paynter | 321—45 X |
| 3,080,534 | 3/1963 | Paynter | 321—2 X |

LLOYD McCOLLUM, *Primary Examiner.*

A. D. PELLINEN, *Assistant Examiner.*